Aug. 29, 1950     E. V. CONRAD ET AL     2,520,382

POT STRAINER

Filed Aug. 12, 1946

Inventor
Edward V. Conrad
and Barzillai G. Worth

By Clarence A. O'Brien
and Harvey B. Jacobson
Attorneys

Patented Aug. 29, 1950

2,520,382

UNITED STATES PATENT OFFICE 2,520,382

POT STRAINER

Edward V. Conrad and Barzillai G. Worth,
East Orange, N. J.

Application August 12, 1946, Serial No. 689,839

4 Claims. (Cl. 210—163.5)

This invention relates to improvements in pot strainers.

An object of the invention is to provide an improved pot or pan strainer comprising a semi-circular perforated plate having a handle formed thereon, and integral means on said plate and handle for supporting said strainer on the top of a pan while tilting the pan to strain the liquid therefrom through the perforations in the strainer plate.

Another object of the invention is to provide an improved semi-circular perforated plate strainer for positioning over a portion of the top of a cooking pan or vessel, said plate strainer being formed with a laterally extending handle adapted to overlie the handle on the pan or vessel, and depending positioning means formed on the plate strainer and its handle for positively engaging a pan and a pan handle to support the strainer in operative position thereon.

A further object of the invention is to provide an improved perforated plate strainer for pots and pans having an angularly disposed transversely curved handle integrally formed thereon, said plate strainer and handle being formed with depending oppositely disposed positioning fingers, whereby when the strainer is positioned on a pan having a handle, the fingers will extend one on the outside of said pan and the other on the inside thereof with the strainer handle seated upon the pan handle and supported thereon by means of opposed depending fingers, to positively position the strainer on the pan.

Another object of the invention is to provide an improved perforated pot or pan strainer which will be highly efficient in operation and relatively inexpensive to manufacture and produce.

Other objects will appear as the description proceeds.

In the accompanying drawings which form a part of this application,

Like characters of reference are used throughout the following specification and the accompanying drawings to designate corresponding parts.

Figure 1:
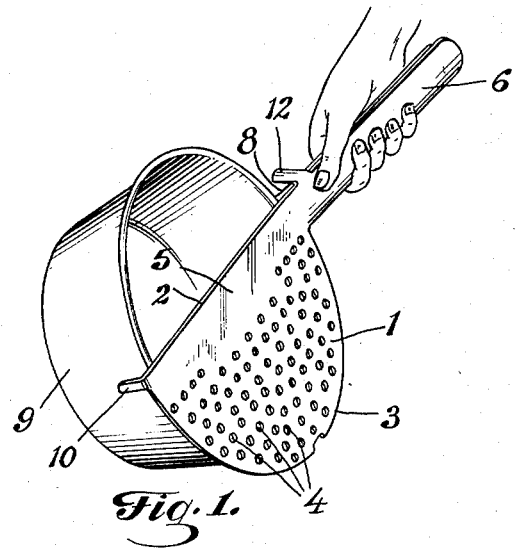
Figure 1 is a perspective view of the improved perforated plate strainer shown in position upon a pan.
Figure 2:
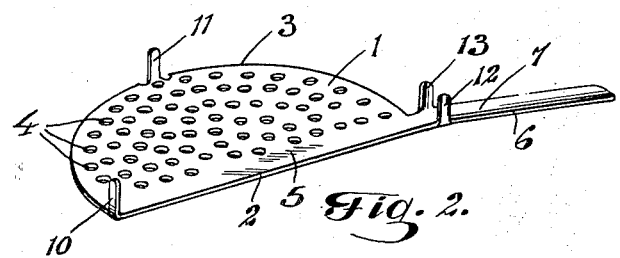
Figure 2 is a bottom view in perspective of the improved perforated plate strainer.
Figure 3:
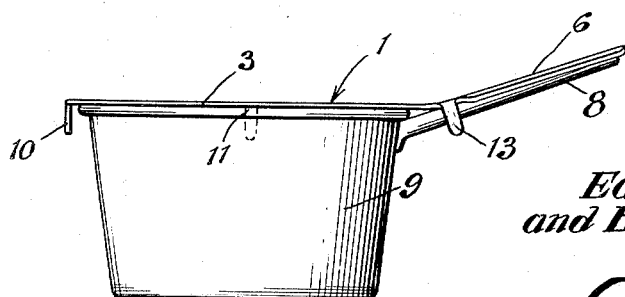
Figure 3 is a side elevation of a cooking pan with handle, with the improved perforated plate strainer supported in operative position thereon.

In carrying out the invention, there is provided an improved pot strainer comprising a semi-circular plate or body 1 being of a size slightly more than the half of a complete circular disk, the same having a flat edge 2 and a rounded edge 3, and formed with a plurality of strainer openings 4 through the major portion of the plate or body 1, with the area adjacent the flat edge 2 being solid and free of perforations or openings to provide a reinforced area 5 in alinement with the laterally extending angled or offset handle 6.

The handle 6 is transversely curved to form a longitudinally extending seat 7 which will seat on the handle 8 on a cooking pan or vessel 9 when the plate strainer is positioned thereon. The continuous alined formation of the handle 6 and the solid area 5 of the plate strainer 1 will provide a rigid construction unweakened by perforations to assure a long time service for the plate strainer.

Depending positioning fingers 10 and 11 will be respectively formed on the outer edge and central side edge of the plate strainer body 1 with finger 10 extending down over the outside of a cooking pan or vessel 9 and finger 11 extending downwardly on the inside thereof when the strainer is placed thereon to positively position the strainer. A pair of oppositely disposed depending positioning fingers 12 and 13 will be integrally formed on the inner end of the strainer handle 6 to fit down over the opposite sides of the pan handle 8 when the strainer is in position, with the pan handle 8 being received and seated on the longitudinally extending seat 7 in the under surface of the strainer handle 6, said handles 6 and 8 being angled and extending in parallel relation with each other.

From the foregoing description, it will be apparent that there has been devised and provided an improved plate strainer which may be positioned only in one manner upon a cooking pan and its handle, and when in position, the same will be positively secured against movement while straining the liquid from the cooking pan or vessel.

While the preferred embodiment of the instant invention has been illustrated and described, it will be understood that it is not intended to limit the scope of the invention thereto, as many minor changes in detail of construction may be resorted to without departure from the spirit of the invention.

Having thus described our invention what we claim as new and desire to secure by Letters Patent of the United States is:

1. A draining device for use in association with a pot having an angularly extending handle comprising a semi-circular plate including an arcuate edge defining a first portion, perforations in said first portion, a substantially straight edge opposite said arcuate edge forming an imperforate second portion, said first and second portions being integrally juxtapositioned, a handle integrally extending outwardly from said second portion, depending positioning fingers on said handle adjacent said second portion, a depending integral placement finger on said second portion opposite the handle, a peripheral notch disposed in said first portion, a depending positioning finger received in said notch, and coactive with said second portion finger for positioning the plate on a pot.

2. A draining device for use in association with a pot having an angularly extending handle comprising a semi-circular plate including an arcuate edge defining a first portion, perforations in said first portion, a substantially straight edge opposite said arcuate edge forming an imperforate second portion, said first and second portions being integrally juxtapositioned, a handle integrally extending outwardly from said second portion, depending positioning fingers on said handle adjacent said second portion, a depending integral placement finger on said second portion opposite the handle, a peripheral notch disposed in said first portion, a depending positioning finger received in said notch, and coactive with said second portion finger for positioning the plate on a pot, said handle being arcuate in cross section forming a longitudinally extending seat for a pot handle.

3. For use with a handled pot, a drainer formed from a single piece of material and including an elongated solid handle, a semi-circular perforated plate formed integrally at one of the side edges of the handle adjacent one of the ends thereof, opposed depending parallel positioning fingers formed at the opposing side edges of the handle and spaced from the plate, a depending positioning finger formed integrally on the periphery of the plate and a complementary finger depending from the unattached end of the handle adjacent the plate.

4. For use with a handled pot, a drainer formed from a single piece of material and including an elongated solid handle, said handle having a first section and a second section offset therefrom at one end, a semi-circular perforated plate formed integrally at one of the side edges of the first section of the handle, opposed depending parallel positioning fingers formed at the opposing side edges of the second section of the handle and disposed adjacent the plate, said fingers being adapted to engage the side edges of a pot handle and prevent lateral displacement of the drainer handle, a depending positioning finger formed on the rounded edge of the plate and a complementary positioning finger formed on the unattached end of the first section of the handle and disposed at right angles to said handle.

EDWARD V. CONRAD.
BARZILLAI G. WORTH.

REFERENCES CITED

The following references are of record in the file of this patent:

UNITED STATES PATENTS

| Number | Name | Date |
|---|---|---|
| 434,452 | Mathews | Aug. 19, 1890 |
| 639,208 | Buckley | Dec. 19, 1899 |
| 1,589,486 | Sharpneck | June 22, 1926 |
| 1,623,397 | Dunlap | Apr. 5, 1927 |
| 1,875,303 | Bird | Aug. 30, 1932 |
| 1,953,338 | Claire | Apr. 3, 1934 |
| 2,466,347 | Ziemianin, Jr. | Apr. 5, 1949 |

FOREIGN PATENTS

| Number | Country | Date |
|---|---|---|
| 372,800 | Germany | of 1923 |